(12) United States Patent
Morimoto

(10) Patent No.: US 7,344,069 B1
(45) Date of Patent: Mar. 18, 2008

(54) POS SYSTEM

(75) Inventor: Tetsuyuki Morimoto, Kawasaki (JP)

(73) Assignee: Nitsuko Corporation, Tokyo (JP)

( * ) Notice: Subject to any disclaimer, the term of this patent is extended or adjusted under 35 U.S.C. 154(b) by 598 days.

(21) Appl. No.: 09/611,571

(22) Filed: Jul. 7, 2000

(30) Foreign Application Priority Data

Feb. 9, 2000 (JP) ............................. 2000/031945

(51) Int. Cl.
G06K 15/00 (2006.01)
G06F 15/16 (2006.01)

(52) U.S. Cl. ...................... 235/383; 382/251; 709/247

(58) Field of Classification Search ................ 705/21; 235/383; 382/251; 709/247
See application file for complete search history.

(56) References Cited

U.S. PATENT DOCUMENTS

| 3,181,124 | A | * | 4/1965 | Hammel | 705/21 |
|---|---|---|---|---|---|
| 3,852,571 | A | * | 12/1974 | Hall et al. | 235/379 |
| 5,003,472 | A | * | 3/1991 | Perrill et al. | 705/21 |
| 5,426,427 | A | * | 6/1995 | Chinnock et al. | 709/239 |
| 5,448,047 | A | * | 9/1995 | Nair et al. | 235/440 |
| 5,696,909 | A | * | 12/1997 | Wallner | 705/44 |
| 5,745,705 | A | * | 4/1998 | Iguchi | 705/21 |
| 5,828,848 | A | * | 10/1998 | MacCormack et al. | 709/247 |
| 5,987,426 | A | * | 11/1999 | Goodwin, III | 705/21 |
| 6,167,378 | A | * | 12/2000 | Webber, Jr. | 705/8 |
| 6,304,606 | B1 | * | 10/2001 | Murashita et al. | 375/240.24 |
| 6,408,307 | B1 | * | 6/2002 | Semple et al. | 707/104.1 |
| 6,570,967 | B2 | * | 5/2003 | Katz | 379/93.12 |
| 6,601,040 | B1 | * | 7/2003 | Kolls | 705/14 |
| 6,754,704 | B1 | * | 6/2004 | Prorock | 709/224 |
| 6,845,363 | B1 | * | 1/2005 | Matsubara et al. | 705/16 |
| 2002/0126632 | A1 | * | 9/2002 | Terranova | 370/328 |
| 2002/0156683 | A1 | * | 10/2002 | Stoutenburg et al. | 705/16 |

OTHER PUBLICATIONS

"Faster phone systems are poised at the starting line", POS News, Chicago, vol. 10, Iss. 9, p. 1 (four pages total).*
"Self-service ticketing machines are tried but not yet proven", POS News, Chicago, vol. 9, Iss. 9, p. 5 (two pages total).*

* cited by examiner

Primary Examiner—Andrew Joseph Rudy
(74) Attorney, Agent, or Firm—Straub and Pokotylo; John C. Pokotylo

(57) ABSTRACT

A POS system comprising a host unit and a plurality of POS terminal units connected thereto via a predetermined communication line for data transfer/receipt between each POS terminal unit and the host unit is disclosed. Execution programs of the POS system are stored in the host unit, and each POS terminal unit is not provided with any POS system execution program, and has at least a transmission data generating function and a communication function for data exchange with the host unit.

18 Claims, 2 Drawing Sheets

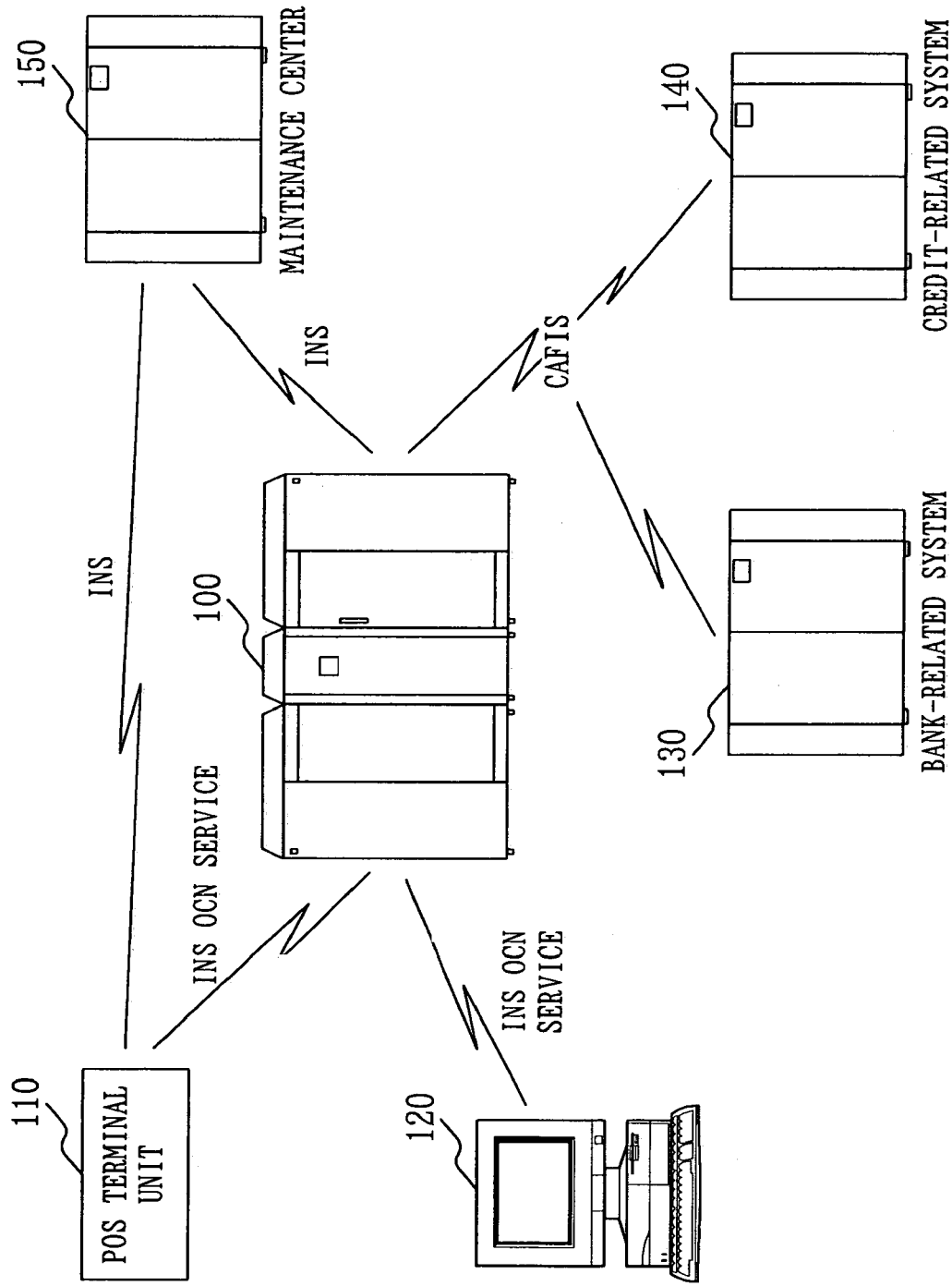

POS SYSTEM

BACKGROUND OF THE INVENTION

The present invention relates to POS systems and, more particularly, to a point of sale ("POS") system with a number of terminal units.

In a prior art POS system, a plurality of POS terminal units are connected via a telephone line to a host unit, and the data inputted from the terminal units are sent out to the host unit. For example, in a convenience store, sales data such as sales items, quantities and dates, which are inputted from a terminal unit installed in each shop, are sent out to the host unit. The host unit receives and sums up these sales data, and executes the most efficient stock management. The terminal units are provided with execution programs peculiar to the system, and in actual service these programs are started to execute pertinent processes.

In the prior art POS system, in which execution programs are stored in individual terminal units, whenever the execution programs peculiar to the system are updated to a new version, the execution programs stored in all the terminal units have to be updated to the new version. In addition, the management of the terminal units and the system should be performed for each terminal unit installed in each shop. This inevitably leads to scale increase of the system construction, resulting in reducing system operability.

In addition, the data to be sent out from all the terminal units are enormous in quantity. Accordingly, sales data and other data are not frequently sent out as real-time data from each terminal unit to the host unit. Instead, a so-called batch process is executed, in which the data is collectively sent out at night or the like. This means that it is impossible to address quickly a trouble or the like in the circumstances of real-time processing during the duty service time of the terminal unit.

SUMMARY OF THE INVENTION

An object of the present invention is to provide a POS system capable of great reduction of the terminal management cost and terminal installation cost.

Another object of the present invention is to provide a POS system capable of coping with any trouble at headquarters, and reducing the speed and expenditures of coping with the trouble.

A further object of the present invention is to provide a POS system simplified in construction, able to reduce machine costs and improve reliability.

A still further object of the present invention is to provide a POS system, which, with data present in a headquarters server, does not only permit readily backing up data, but also permits real-time data processing.

A yet further object of the present invention is to provide a POS system, in which the terminal can be started in a minimum time, so that at the time of non-use of the terminal the power supply can be turned off, which is desired for saving energy.

Yet another object of the present invention is to provide a POS system, which does not require development of any software for data transfer with headquarters and software for master-related data production, thus permitting reduction of software-related cost.

A further object of the present invention is to provide a POS system, which does not require any master updating time, thus eliminating time, in which the POS can not be used.

According to an aspect of the present invention, there is provided a POS system comprising a host unit and a plurality of POS terminal units connected thereto via a predetermined communication line for data transfer/receipt between each POS terminal unit and the host unit, wherein: execution programs of the POS system are stored in the host unit; and each POS terminal unit is not provided with any POS system execution program, and has at least a transmission data generating function and a communication function for data exchange with the host unit.

The plurality of terminal units further have a display function of displaying transmitted data and display image sent out from the host unit, and a printing function of printing predetermined data. The transfer/receipt data is subjected to data quantity reduction and compression. The data reduction and compression are performed in units of image data frames by comparing the present frame and immediately preceding frame of transferred data, only data recognized to have been changed with respect to the immediately preceding frame being compressed. The data quantity reduction and compression are executed by a process of transferring only position data and character data in character data frames. The POS system is managed by a managing system provided only on the host unit side. Each communication between the POS terminal unit and the host unit is executed via a local area network ("LAN") or a wide area network ("WAN"). Once data has been sent out from a POS terminal unit to the host unit side, it is not held in the POS terminal side.

According to another aspect of the present invention, there is provided a POS system comprising a host unit and a plurality of POS terminal units connected thereto via a predetermined communication line for data transfer/receipt between each POS terminal unit and the host unit, wherein: execution programs of the POS system are stored in the host unit; each POS terminal unit is not provided with any POS system execution program, and has at least a transmission data generating function and a communication function for data exchange with the host unit; and a purchase amount settling function in each POS terminal unit is executed via the host unit.

According to other aspect of the present invention, there is provided a POS system comprising a host unit and a plurality of different POS units connected via predetermined communication line thereto and operable in POS systems for different kinds of services, wherein: POS system execution programs for the different kinds of services are collectively stored in the host unit; and each POS unit is not provided with any corresponding system execution program, and has at least a transmission data generating function and a communication function for data exchange with the host unit.

A maintenance system for the maintenance of the plurality of the POS systems for the different kinds of services is provided only in the host unit.

According to further aspect of the present invention, there is provided a POS system comprising a host unit and a plurality of different POS units connected via predetermined communication line thereto and operable in POS systems for different kinds of services, wherein: POS system execution programs for the different kinds of services are collectively stored in the host unit; each POS unit is not provided with any corresponding system execution program, and has at least a transmission data generating function and a communication function for data transfer/receipt with the host unit; and a purchase amount settling function in each POS terminal unit is executed via the host unit.

Other objects and features will be clarified from the following description with reference to attached drawings.

BRIEF DESCRIPTION OF THE DRAWINGS

FIG. 2 is a view showing a network organized as an example of application of the present invention.

PREFERRED EMBODIMENTS OF THE INVENTION

Figure 1:
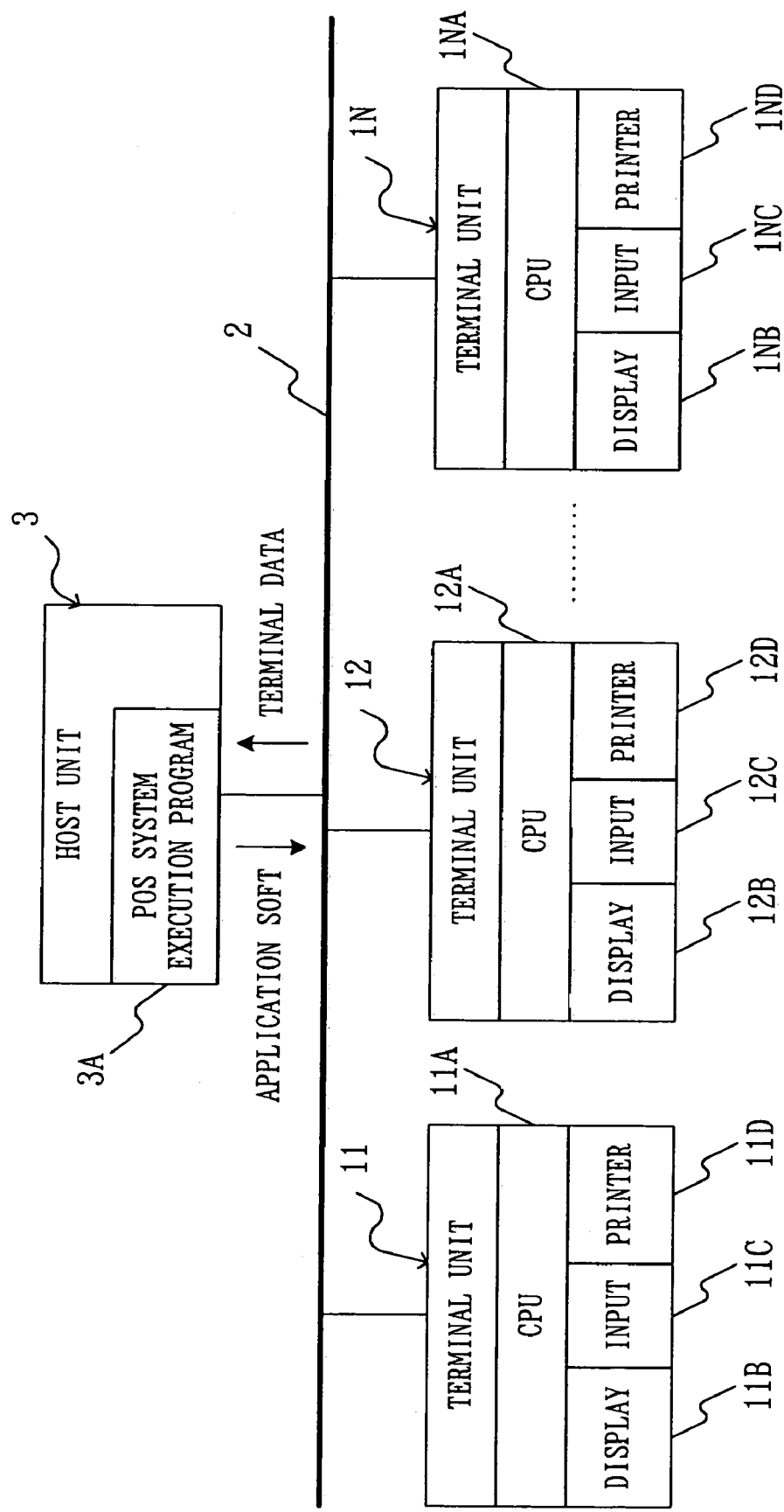
FIG. 1 is a view showing the construction of an embodiment of the POS system according to the present invention.

Preferred embodiments of the present invention will now be described with reference to the drawings. FIG. 1 is a view showing the construction of an embodiment of the POS system according to the present invention.

In this embodiment, a plurality of terminal units 11 to 1N are connected via a communication line 2, such as a telephone line, a radio line, an optical line, etc. to a host unit 3, and the data can be exchanged between each terminal unit and the host unit. The individual terminal units 11 to 1N include CPUs 11A to 1NA, displays 11B to 1NB, input means 11C to 1NC and printers 11D to 1ND.

In this embodiment, unlike the prior art, the execution programs 3A are not provided in the terminal units 11 to 1N, but they are provided with only a communicating function and a function of receiving the data, displaying image data and printing data transmitted from the terminal units. Instead, execution programs and maintenance and control programs are stored in the sole host unit 3. Thus, on the communication line, only minimal necessary data such as display image data and printing data are received, and other data for controlling these terminal units and host unit are unnecessary. Thus, far less data quantity is necessary.

While only the display image data and printing data to be transmitted appear on the communication line 2 as noted above, more efficient data transfer is obtainable by using a method of reducing and/or compressing the quantity of transmitted data. Accordingly, in this embodiment the transferred image data is dealt with in units of frames for comparing the present and immediately preceding transferred data frames, and only the data with recognized changes are transmitted by compressing them. Regarding the character data among the transmitted data in the POS system, color and gradation data are transmitted not as the image data but as coded data. By coding the data, only a minimum transmission data quantity is necessary.

In this embodiment, the terminal unit side is provided with only the terminal function in the intrinsic sense, i.e., input/output means such as a keyboard, a touch panel and as voice input means, display means for displaying image and printing means for printing the image. The terminal unit construction is thus simplified, and it is possible to reduce the machine cost and improve the reliability. Other potential sources of high cost, i.e., system program executing means and control software, are provided on only the host unit side. Thus, POS system execution program version updates are necessary only on the host unit side, and version updates of each POS terminal unit installed in each shop as in the prior art is unnecessary. The system management thus can be greatly simplified, and it is possible to obtain pronounced corresponding cost reduction. Thus, any trouble can be addressed by headquarters on the host unit side, ready line management is permitted and system reliability is provided.

Furthermore, no operation of installing execution program in each POS terminal unit is necessary.

The operating system in the host unit is a simplified operating system (OS), and the communication between each terminal unit and the host unit is executed via LAN or WAN.

In this embodiment, the data is in a host unit side server. Thus, it is possible to readily back up the data, eliminate times during which the POS terminal unit cannot be used, and obtain real-time data processing.

Still further, each terminal unit is provided with only functions of inputting data, displaying data on screen and printing data, and after transmission of data from a terminal unit to the host unit side, the data need not be held in the terminal unit. Thus, no memory to such end is necessary, and the construction of the terminal units can be simplified and realized at low cost.

Yet further, the terminal unit is not provided with any system execution program but is provided with only a communication means, a display, a printer, etc., so that operation start time is very short and it can be started in a minimum time. When the terminal unit is not used, the power supply may be disconnected, which is desired from the energy saving standpoint.

Moreover, it is unnecessary to develop software for data transfer between the host unit and each POS terminal unit or produce master-related updating data. Thus, it is possible to greatly reduce software development exepeditures.

FIG. 2 is a view showing a network organized as an example of application of the present invention. The network is centered on a host unit 100, and shop-side POS terminal unit 110, option terminal unit 120, bank-related system 130, credit-related system 140 and maintenance center 150 are connected to the host unit 100 via various high-rate data transfer lines (such as INS, OCN service and CAFIS). The shop side POS terminal unit 100 may be constituted by a variety of shops, such as a convenience store, a fast food store and a credit card subscriber shop. The option terminal unit 120 may be provided with such peripheral units as color printer, and it can receive the data transmitted from the POS terminal unit via the host unit 110 for data analysis, customer management processing, etc. The unit 120 is provided on the main shop side which controls the POS system. Of course the unit 120 may be provided, if desired, on the shop side with a POS terminal unit provided therein. The bank-related system 130 includes a memory for storing data from an ATM or like terminal. The credit-related system 140 has a memory for storing credit-processed data. The maintenance center 140 is usually provided on the side of the host unit 100 for the system maintenance. In this embodiment, however, the center 140 is provided as an independent unit connected to the host unit 100 via the communication line. This is effective when it is desired to provide the center 140 separately due to such problem as installation space on the side of the host unit 100.

The bank- and credit-related systems 130 and 140 may have a function of executing a settling process according to sales data transmitted from the POS terminal unit 110 via the host unit 100.

This embodiment is not of a type concerning a single kind of service, such as one that data is transmitted from a terminal unit installed in a convenience chain store to the host unit side. Instead, in this embodiment a plurality of different kinds of services are connected to the host unit 100, which executes processes concerning these different kinds of services. In this case, the maintenance center system 150 provided separately of the host unit executes the system maintenance. This has an effect of suppressing the enlargement of the scale of the host unit 100. In addition, with the exclusive system provided for the system maintenance, it is possible to provide highly reliable management.

In this system, programs for executing POS system processes of the plurality of different kinds of services are stored in the host unit 100, and business processes are executed according to these programs.

As has been described in the foregoing, the POS system according to the present invention permits simplification of the system construction, improvement of the system management and real-time processes without particular line. Specifically, according to the present invention the following effects are obtainable.

(1) Since no application program is provided in any terminal, it is possible to greatly reduce the terminal management cost and terminal installation cost.

(2) Any trouble can be addressed by headquarters, and it is possible to reduce the speed and expenditures of coping with the trouble.

(3) Since the terminal construction is simplified, it is possible to reduce the machine cost and improve the reliability.

(4) Since data is on the headquarters server, not only data can be readily backed up, but also the data processing can be executed as real-time processing.

(5) The terminal can be started in a minimum time. Thus, at the time of non-use of the terminal, the power supply can be turned off, which is desire to save energy.

(6) It is unnecessary to develop any software for data transfer with respect to the headquarters server and software for master-related updating data production, and it is thus possible to reduce software-related cost.

(7) The terminal does not require any master updating time, and it is thus possible to eliminate time, in which the POS can not be used.

Other effects of the present invention than the above effects are adequately described in the above description, and are also obvious form the description of the embodiments.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A point-of-sale system comprising a host unit and a plurality of point-of-sale terminal units connected thereto via a predetermined communication line for data transfer/receipt between each point-of-sale terminal unit and the host unit, wherein:

maintenance programs for the point-of-sale system are stored in the host unit;

execution programs of the point-of-sale system are stored in the host unit;

each point-of-sale terminal unit is not provided with any point-of-sale system execution program, and has at least a transmission data generating function and a communication function for data exchange with the host unit;

the transfer/receipt data is subjected to data quantity reduction and compression; and the data reduction and compression are performed in units of image data frames by comparing the present frame and immediately preceding frame of transferred data, only data recognized to have been changed with respect to the immediately preceding frame being compressed.

2. The point-of-sale system of claim 1 wherein at least one of the plurality of point-of-sale terminal units includes a display and a printer.

3. The point-of-sale system according to claim 1, wherein a purchase amount settling function is performed exclusively on the host.

4. The point-of-sale system according to claim 1, wherein data having been sent out from a point-of-sale terminal unit to the host unit side is not held in the point-of-sale terminal side.

5. The point-of-sale system according to claim 1, wherein the data quantity reduction and compression are executed by a process of transferring only position data and character data in character data frames.

6. The point-of-sale system according to claim 1, wherein the point-of-sale system is managed by a managing system provided only on the host unit side.

7. The point-of-sale system according to claim 1, wherein each communication between the point-of-sale terminal unit and the host unit is executed via a network selected from a group consisting of a LAN and a WAN.

8. The point-of-sale system of claim 1 wherein at least one of the plurality of point-of-sale terminal units includes a voice input.

9. A point-of-sale system comprising a host unit and a plurality of point-of-sale terminal units connected thereto via a predetermined communication line for data transfer/receipt between each point-of-sale terminal unit and the host unit, wherein:

execution programs of the point-of-sale system are stored in the host unit;

each point-of-sale terminal unit is not provided with any point-of-sale system execution program, and has at least a transmission data generating function and a communication function for data exchange with the host unit; and execution programs of the point-of-sale system are updated only at the host, wherein the transfer/receipt data is subjected to data quantity reduction and compression, and wherein the data reduction and compression are performed in units of image data frames by comparing the present frame and immediately preceding frame of transferred data, only data recognized to have been changed with respect to the immediately preceding frame being compressed.

10. The point-of-sale system of claim 9 wherein at least one of the plurality of point-of-sale terminal units includes a voice input.

11. The point-of-sale system of claim 9 wherein at least one of the plurality of point-of-sale terminal units includes a display and a printer.

12. A system for effecting point of sale functions, the system comprising:

a) a host, the host including means for storing all programs related to execution of the point of sale system, and means for storing all programs related to maintaining the point of sale system;

b) at least two point of sale terminals, each of the at least two point of sale terminals having
i) means for generating transmission data, and
ii) means for exchanging data with the host; and c) communication means coupled with the host and each of the at least two point of sale terminals, and facilitating communications between the host and each of the at least two point of sale terminals, wherein the communication means include means for performing data quantity reduction and compression in units of image data frames by comparing the present frame and immediately preceding frame of transferred data, only data recognized to have been changed with respect to the immediately preceding frame being compressed.

13. The system of claim 12 wherein each of the at least two point of sale terminals includes a voice input.

14. The system of claim 12 wherein each of the at least two point of sale terminals further includes a display and a printer.

15. The system according to claim 12, wherein the host provides at least two of the at least two point of sale terminals with different services.

16. In a system including a host, at least two point of sale terminals, and communications means coupled with the host and each of the at least two point of sale terminals, and facilitating communications between the host and each of the at least two point of sale terminals, a method for effecting point of sale functions, the method comprising:

a) storing, solely at the host, all programs related to execution of the point of sale system;
b) generating, by each of the point of sale terminals, data related to sales; and
c) forwarding the data related to sales from each of the point of sale terminals to the host as soon as the data is generated, wherein the data is subjected to data quantity reduction and compression, and wherein the data reduction and compression are performed in units of image data frames by comparing the present frame and immediately preceding frame of transferred data, only data recognized to have been changed with respect to the immediately preceding frame being compressed.

17. The method of claim 16 further comprising:

d) purging, as soon as the data related to sales has been forwarded to the host, the data related to sales from the point of sale terminal forwarding the data.

18. The method of claim 16 further comprising:

d) settling a purchase amount exclusively using the host.

\* \* \* \* \*